United States Patent Office 3,081,372
Patented Mar. 12, 1963

3,081,372
HEAT SEALABLE SEPARATOR FILM
Daniel G. Soltis, Cleveland, Ohio, assignor to Union Carbide Corporation, a corporation of New York
No Drawing. Filed Feb. 17, 1960, Ser. No. 9,166
3 Claims. (Cl. 136—145)

This invention relates to a heat sealable film for use in galvanic cells, and more particularly, it relates to a separator film for use in cathodic envelope cells.

A major advance in flat type dry cell technology is disclosed in U.S. Patent No. 2,870,235, issued to Union Carbide Corporation on January 20, 1959. The so-called cathodic envelope cell which is therein disclosed permits more efficient utilization of cell materials and accordingly, such a cell yields higher output than is attainable in conventional cells of similar size.

In general, a cathodic envelope cell is a unit flat cell which comprises a consumable metal anode wrapped in a bibulous separator film, electrolyte wet depolarizing mix on each side of the wrapped anode, the anode and the electrolyte mix being enveloped by a flexible cathode collector, and the whole being sealed in a flexible non-conducting plastic envelope.

The method of wrapping the anode in the separator film disclosed in the above-identified patent consists of coating a strip of paper with a bibulous anode-contacting material such as methylcellulose, wrapping the anode with said paper, and finally running the wrapped anodes through a long drying oven. Unfortunately this is a time consuming and costly process.

Accordingly, the principal object of the invention is to provide a readily heat sealable film for use in galvanic cells.

A more specific object of the invention is to provide a separator material which may be heat sealed around or to a metal anode at high speeds without impairing its function as a separator when it is later introduced into a cathodic envelope cell.

Another object of the invention is to provide a separator material which may be heat sealed without requiring the addition of an adhesive or activator of any sort.

Another object of the invention is to provide a separator material which may be heat sealed around a metal anode simply by the employment of opposed heated pressure pads thereby eliminating the need for paste, applicator, long and costly drying tunnels, glue-pots, and the handling of wet paper.

Broadly stated the objects of the invention are accomplished by a heat sealable film which comprises a formulation of thermo-plastic water soluble polyethylene oxide and water which is carried on a paper support. When in addition to its function as a heat sealable film, the film is intended to serve as a separator, such as in a cathodic envelope cell, a quantity of methylcellulose must also be present along with the polyethylene oxide and water.

The term "polyethylene oxide" as used herein and in the appended claims refers to a water soluble resin of the high molecular weight polymers of ethylene oxide. Polyethylene oxide is commercially available in four viscosity grades which correspond to varying molecular weights. The resins which are suitable for the practice of the invention range from one having a viscosity of approximately 300 centipoises for a 5% aqueous solution to a resin having a viscosity of approximately 20,000 centipoises for a 2% aqueous solution; the viscosity being measured by a Brookfield viscosimeter running at 2 r.p.m. with a No. 2 spindle and the solution having a temperature of 25° C. When the heat sealable film of the invention is to be used as a separator in a cathodic envelope cell, the resin should have a viscosity in the approximate range of from 700 to 20,000 centipoises. The preferred resin is one having a viscosity of approximately 6500 centipoises. When the heat sealable film is to be used in other type galvanic cells where its function as a separator is not essential, the resin having a viscosity of 300 centipoises is suitable.

In the practice of the invention, when making a heat sealable separator film for use in cathodic envelope cells, the finished separator film is suitable when its composition falls within the following range: 35 to 75% polyethylene oxide, 3 to 6% water, and the balance methylcellulose. Other ingredients in addition to polyethylene oxide, methylcellulose and water may optionally be added.

As a specific example of this embodiment of the invention, the following formulation for coating on a paper support may be used.

4.5 pounds of 6,500 centipoise grade polyethylene oxide
2 pounds of 4,000 centipoise grade methylcellulose
2 pounds of alpha cellulose fibers
418 grams of calomel
7 cubic centimeters of a 75% solution of sodium dioctyl sulfosuccinate in water with an alcohol emulsifier
12 grams sodium hexameta phosphate
5500 cubic centimeters of water The above formulation may suitably be mixed as follows:

Place the dry ingredients in a blender and mix for 5 minutes. The wet ingredients are then added slowly and stirred until the mass becomes tenacious. At this time the mixture should be transferred to a two roll mill and worked into a homogeneous smooth mass, a procedure which takes approximately 5 to 8 minutes. During blending, the mix will adhere to both rolls until it becomes well mixed, at which time, the mixture will transfer to one roll, from which it can be readily removed. During this procedure, cooling should be provided to the rolls of the mill to offset any temperature build-up which may occur.

A formulation so prepared may then be deposited on a paper support and dried to give the finished separator film by the use of conventional coating machines and practices as are well known in the art. Using this formulation, it is possible to coat and dry at machine speeds of 48 to 52 feet per minute at a temperature in the range of from about 250° F. to 300° F. In drying the film, it is essential, for best results that the moisture level in the film be held in the range of from approximately 3 to 6% of the formulation.

The separator film so prepared is readily heat sealable to itself and is excellent for use in wrapping anodes which are to be employed in cathodic envelope cells. Once an anode has been wrapped with the separator film of the invention, the film may be heat sealed to itself in as little time as ½ to 1 second by applying temperatures in the range of from 180° F. to 220° F. to the separator film.

While methylcellulose is essential for preparing a heat sealable film for use as a separator in a cathodic envelope cell, a heat sealable film for use in galvanic cells may merely comprise 94 to 97% polyethylene oxide and the remainder water. This heat sealable film could be used for instance in assembling the anode in magnesium cells. In such cells, a heat sealable film which must double as a separator is not required, since the chemistry of a magnesium cell is such that the products from the anode form a contacting layer which acts as the separator.

I claim:

1. A heat sealable separator film for use in cathodic envelope cells which comprises a formulation of approximately 35 to 75% polyethylene oxide, 3 to 6% water, and the remainder methylcellulose; said formulation being carried on a paper support.

2. A heat sealable separator film for use in cathodic envelope cells which comprises a formulation of approximately 35 to 75% polyethylene oxide, 3 to 6% water, the remainder being methylcellulose and small amounts of alpha cellulose fibers, calomel, sodium dioctyl sulfosuccinate and sodium hexameta phosphate; said formulation being carried on a paper support.

3. In a galvanic cell having an anode and an electrolyte-wet depolarizer mix, a separator between said anode and said depolarizer mix comprising a formulation of approximately 35 to 75 percent polyethylene oxide, 3 to 6 percent water, and methylcellulose, said formulation being carried on a paper support.

References Cited in the file of this patent

UNITED STATES PATENTS

| | | |
|---|---|---|
| 2,285,095 | Rothrock | June 2, 1942 |
| 2,551,799 | Hatfield | May 8, 1951 |
| 2,762,858 | Wood | Sept. 11, 1956 |
| 2,870,235 | Soltis | Jan. 20, 1959 |
| 2,887,522 | Mackenzie | May 19, 1959 |
| 2,924,538 | Nadelman | Feb. 9, 1960 |

FOREIGN PATENTS

| | | |
|---|---|---|
| 557,218 | Great Britain | Nov. 10, 1943 |
| 212,648 | Australia | Jan. 22, 1958 |

OTHER REFERENCES

Industrial and Engineering Chemistry (vol. 50, No. 1), January 1958, published by American Chemical Society, Washington, D.C. (pages 5 to 16).